Oct. 21, 1969   R. E. RADFORD   3,473,784
RESILIENT LINER ELEMENT FOR BUTTERFLY VALVES
Filed May 16, 1966   3 Sheets-Sheet 1

INVENTOR.
Robert E. Radford
BY William S. Dorman
ATTORNEY

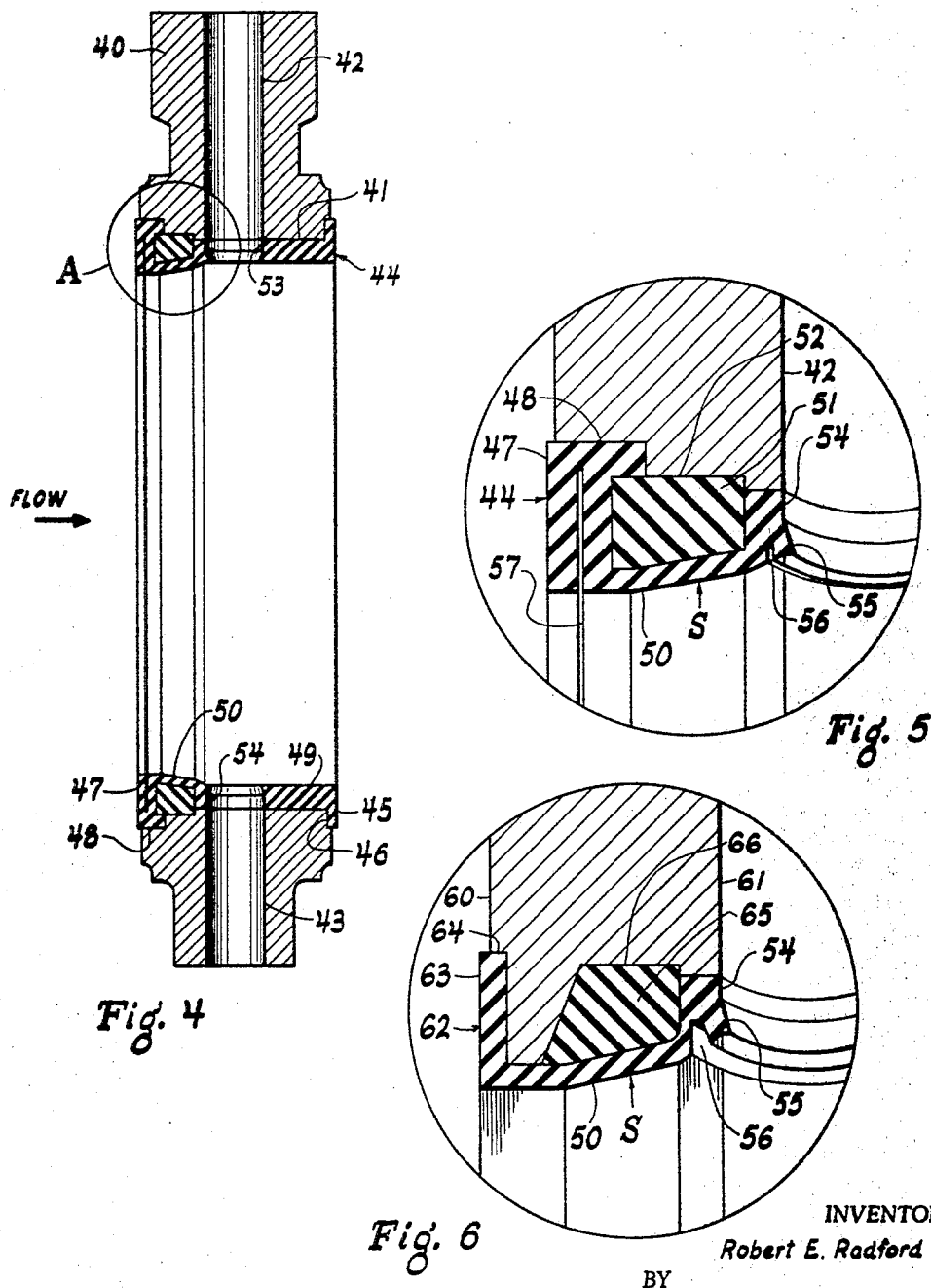

3,473,784
RESILIENT LINER ELEMENT FOR
BUTTERFLY VALVES
Robert E. Radford, Tulsa, Okla., assignor to Oil Capital
Valve Company, Tulsa, Okla., a corporation of
Oklahoma
Filed May 16, 1966, Ser. No. 550,191
Int. Cl. F16k *1/226, 25/00;* F16l *37/28*
U.S. Cl. 251—306                                                             7 Claims

ABSTRACT OF THE DISCLOSURE

A resilient liner for a butterfly valve of the type having a rigid valve body and a butterfly disc mounted in offset relation with respect to the shaft for rotating the disc, the liner covering the main valve opening and surrounding the shaft portions in sealing relation therewith, the liner having a tapered and resilient portion providing an inclined seating surface for the disc and forming a resulting seat for the disc when the latter is in a closed position transverse to the opening and transverse to the flow stream, the tapered portion sloping radially inwardly from a location adjacent the center line of the shaft portions to a location adjacent one side edge of the liner, the seat portion of the tapered resilient portion being of lesser diameter than the corresponding seating portion of the disc when the latter is not in contact with the seating surface. An important feature of the invention involves making the liner out of Teflon and providing a resilient rubber ring between the liner and the valve body in the region of the tapered portion to create the required resiliency for the tapered portion.

---

The present invention relates to a resilient liner for a butterfly valve and more particularly to the type of butterfly valve wherein the valve disc (or the butterfly portion) is offset in parallel relation to the pivotal axis of the disc.

In the past numerous proposals have been advanced concerning liners for butterfly valves and the prior art shows many of these liners as being made of resilient material such as rubber, various synthetics, plastic materials, etc. The purpose of the prior art proposals, as is one of the purposes of the present invention, is to provide a liner which would be resistant to certain materials which might be corrosive to the valve casing or body. However one of the difficulties involves the provision of an adequate and proper seal between the liner and the valve disc wherein this proper and adequate seal will be maintained during sustained periods of use of the valve. Another disadvantage of the prior art proposals resides in the fact that substantially all of the valve discs are rotatable on an axis which passes through the central plane of the disc; thus the seal for the shaft of the disc occurs in the same general location as the seal for the disc itself thereby compounding the sealing or seating difficulties.

The present invention, therefore, not only provides a resilient liner for a butterfly valve, but also provides a resilient liner having an improved seal between the liner and the valve disc such that this seal can be properly maintained during periods of sustained use. Also, as will hereinafter appear the seal for the shaft of the valve disc is in a location spaced with respect to the seat for the valve disc itself.

Briefly stated, the present invention involves a flexible liner for the valve body of a butterfly valve. The valve body, naturally, is adapted to be placed in a flow stream, for example, by securing the body between the adjacent flanges of two pipe sections. The valve body has a central opening substantially in alignment with the flow stream. Midway between the side edges of the valve body are two transversely and outwardly extending holes in which the shaft portions of the valve disc are rotatably received. The valve disc, however, is offset and in parallel relation with respect to the longitudinal axis of the shaft portions such that the seating of the valve disc against the liner takes place to one side of the location of the holes in the liner for the shaft portions. A particular feature of the present invention involves an inclined or tapered portion on the liner which extends inwardly (towards the center of the valve opening) from a location adjacent the holes for the shaft portions to a location in and beyond the seat for the valve disc itself. Stated somewhat differently the inner terminus of this sloping portion (with regard to the longitudinal direction through the valve) is between the pivot axis for the valve disc and the valve seat whereas the outer terminus for this sloping portion is between the valve seat and the adjacent edge of the liner. Another feature of the present invention resides in the fact that the diameter of the liner at the location where the valve seats is smaller than the outer diameter of the corresponding seating portion of the valve disc. Thus when the valve disc is pivoted to its seated or closed position the peripheral portion of the valve disc will compress the liner slightly radially outwardly. Preferably, the butterfly valve of the present invention is inserted into the flow stream such that, when the valve is in the closed position, the shaft portions for the butterfly disc will be on the downstream side.

In one embodiment of the present invention the valve liner is made substantially entirely of rubber material. In another embodiment of the present invention the liner includes a rigid back-up ring which bears against the surface of the valve opening with the remainder, including the inner portion and the flange portions, being made substantially of rubber material; another embodiment of the present invention involves the use of Teflon as the liner element particularly where the valve is required to handle such highly corrosive material as sulphuric acid and the like. Where the Teflon liner is used it is necessary to employ a rubber back-up ring behind the tapered portion to give the needed resilience to this tapered portion since Teflon, by itself, is not sufficiently resilient.

In the liners of the present invention the inner portions of the holes for the shaft portions are tapered inwardly so as to be slightly smaller than the diameter of the shaft portions themselves. Thus the liner at the inner portions of these holes will firmly grip the shaft portions to form a seal against the shaft portions. In the case of the Teflon liner, it is desirable to provide an annular relief groove surrounding each of these holes to allow the liner to "give." In the liner which includes the rigid back-up ring, an O-ring seal can be provided in each of the shaft holes of the ring so as to provide a secondary seal for the shaft portions.

Therefore, in light of the above, it is the principal object of the present invention to provide a resilient liner for a butterfly valve having an improved seal or seat between the liner and the valve disc such that this seal can be properly maintained during periods of sustained use.

It is another object of the present invention to provide a liner for a butterfly valve as set forth herein wherein the seal for the shaft portions are in a location spaced with respect to the seat for the valve disc.

It is another object of the present invention to provide a liner for a butterfly valve including a tapered portion in the seating location for the valve and wherein the part of this tapered portion which is contacted by the valve disc is of smaller diameter than the corresponding seating portion of the valve disc.

It is still another object of the present invention to provide a liner for a butterfly valve of the type described above wherein the liner is made substantially entirely of rubber material.

It is a further object of the present invention to provide a liner of the type described above which includes a rigid back-up ring which bears against the surface of the valve opening, with the remainder of the liner being made substantially of rubber material.

It is another object of the present invention to provide a liner of the type described above wherein the rigid back-up ring includes O-ring seals providing a secondary seal for the shaft portions.

It is still another object of the present invention to provide a liner of the type described above wherein the holes for the shaft portions adjacent the inner surface of the liner are slightly smaller in diameter than the shaft portions received therethrough so as to provide a primary seal for the shaft portions.

It is still another object of the present invention to provide a liner of the type described above wherein the liner is made of Teflon having a resilient back-up ring behind the tapered portion to provide the proper resilience to this tapered portion.

It is a further object of the present invention to provide a liner of the type described above wherein each of the holes in the liner for the shaft portions is provided with an annular relief groove surrounding each of the holes.

It is another obpect of the present invention to provide a Teflon liner of the type described above including a slit extending radially outwardly in the liner at a location between the resilient back-up ring and the adjacent side edge of the liner.

Other and further objects and advantageous features of the present invention will hereinafter more fully appear in connection with the detailed description of the drawings in which FIGURE 1 is a side elevation of a valve disc, or butterfly valve, showing the shaft portions as being offset with respect to the plane of the disc;

FIGURE 4 is a diametrical section view through a valve and liner showing another embodiment of the present invention wherein the liner is made of Teflon with a rubber back-up ring;

FIGURE 5 is an enlarged detailed view of the portion included in the circle A of FIGURE 4; and FIGURE 6 is a view similar to FIGURE 5 showing a further embodiment of the Teflon liner.

Figure 1:
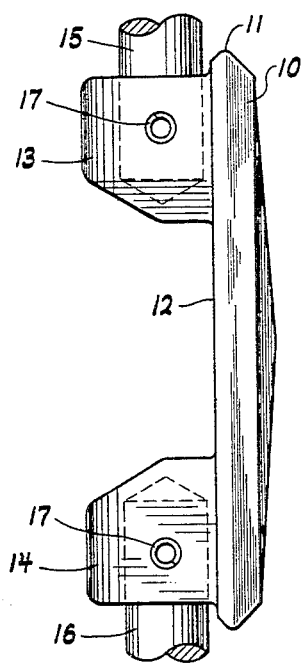
Figure 2:
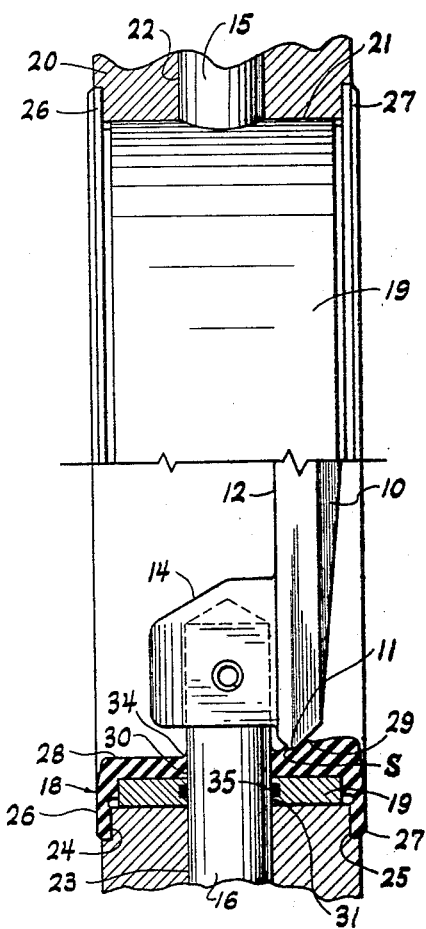
FIGURE 2 is a sectional view through the valve body showing one embodiment of liner of the present invention with the valve disc in seating relation with respect thereto.

Referring to the drawings in detail, FIGURES 1 and 2 show a valve disc 10. Although the valve disc is shown in side elevation, it should be understood that a front elevation (taken from the right hand side of FIGURE 1) would show the valve disc 10 as having a circular outline. Thus the extreme outer edge 11 constitutes a seating portion of a predetermined uniform diameter. The rear surface 12 of the valve disc is provided with two radially projecting ears 13 and 14 which are adapted to receive shaft portions 15 and 16 respectively. The shaft portions are fitted into suitable holes in the ears and are held in place by means of suitable pins 17, for example. Shaft portions 15 and 16 are in axial alignment with each other and thus constitute a vertical pivot axis which is parallel to and offset with respect to the central plane of the valve disc 10. The aforementioned central plane would pass through the seat area 11.

Figure 3:
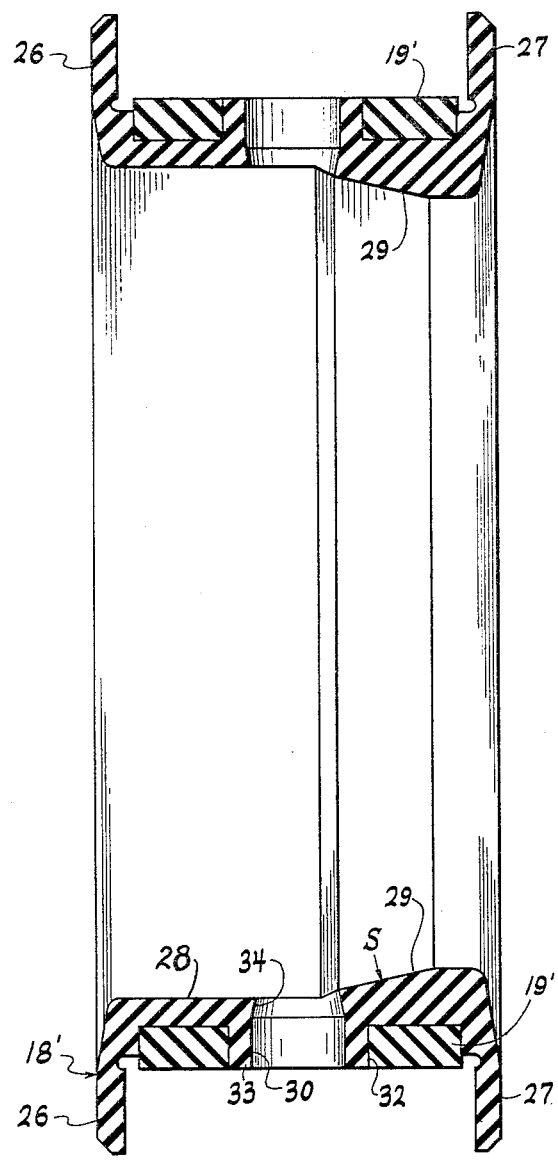
FIGURE 3 is a diametrical section view showing another embodiment of the present invention.

The liner element 18 shown in FIGURE 2 is similar to the liner 18' shown in FIGURE 3 in that they are both constructed of resilient rubber material with a rigid back-up ring. However, the back-up ring 19 in FIGURE 2 is shown as being made of steel whereas the back-up ring 19' of FIGURE 3 is made of hard rubber. As shown in FIGURE 2, the liner element 18 is substantially annular in shape and is received upon a valve body 20 with the valve disc 10 shown in seating relation against the liner. The details of the valve body are generally conventional and are not shown completely. However, the valve body itself is generally annular in shape and is adapted to be inserted in a flow stream by securing this body between adjacent flanges of two pipe sections, for example. The valve body has a central opening 21 which will be substantially in alignment with the flow stream. The valve body is also provided with two transverse and outwardly extending holes 22 and 23 which receive the shaft portions 15 and 16 respectively. In the case of the valve body 20 shown in FIGURE 2, this body is provided with annular recesses 24 and 25 at the opposite side edges thereof. The liner 18 is provided with radially outwardly extending flanges 26 and 27 which fit into the annular recesses 24 and 25 respectively.

The portion of the liner 18 to the left of the shafts 15 and 16 is substantially flat or cylindrical as at 28. However, the portion of the liner 18 to the right of the shaft portions is inclined as at 29 (see especially FIGURE 3). The inclined portion 29 extends inwardly (at a very small angle) towards the axial center of the liner from an inner terminus adjacent the transverse center of the liner to an outer terminus slightly spaced with respect to the flange 27. The place where the seat will occur on the inclined portion 29 is designated by the reference character S shown in FIGURE 3. The diameter of the liner 18 or 18' at the location S is smaller than the corresponding diameter of the seating portion 11 of the disc 10 so as to create the deformed and compressed condition of the liner shown in FIGURE 2. As shown in FIGURE 2, the rubber portion of the liner is provided with a hole 30 which is of substantially the same size as the shaft 16; the steel ring 19 is, likewise, provided with a hole 31 of the same diameter. However, in the case of FIGURE 3, the ring 19' is provided with a somewhat larger hole 32 such that the resilient rubber extends downwardly into the hole 32 as at 33 such that the inner hole 30 is continuous through the thickness of the liner. The above arrangement shown in FIGURE 3 is merely a matter of convenience in molding. The upper end of the hole 30, as shown in FIGURE 3, is tapered slightly inwardly as at 34 to provide a portion which is of lesser diameter than the diameter of the shaft portion 16. Thus when the shaft portion 16 is inserted through the hole 30, the reduced portions 34 will turn upwardly as shown in FIGURE 2 to form a fillet tightly engaging the shaft 16 and constituting a primary seal. In the embodiment shown in FIGURE 2, the annular steel ring 19 is provided with an O-ring seal 35 which constitutes a secondary seal against the shaft 16. Although the above description of the sealing arrangement has been set forth in relation to the shaft portion 16, it should be understood that a similar arrangement exists for shaft portion 15; this is true of the embodiment shown in FIGURE 2 as well as the embodiment shown in FIGURE 3.

The liner of the present invention has been described as being resilient; it is important that the liner be resilient in the area of the seat. The rubber material should be sufficiently soft to yield when the valve disc seats against the tapered portion 29; however, the rubber should be sufficiently hard, on the other hand, to bear against the disc 10 with sufficient force to effect a proper seal. It has been found that a rubber liner of the Buna-N type, having a hardness of 60 to 80 on the durometer scale, is adequate for the purposes of the present invention; however the foregoing information should not be considered as limiting upon the scope of this invention because, obviously, other different types of rubbers can be employed and the above indicated range of hardness is merely illustrative; any resilient material meeting the general conditions briefly described above would fall within the purview of the present invention.

It is important that the location of the intended seat on the tapered portion of the liner be somewhat smaller than the external diameter of the corresponding seating portion on the valve disc. Purely by way of information it might be mentioned that a nominal 4" butterfly valve would have a valve disc with a 4.25" external diameter seating portion; the corresponding liner for a valve of this size would be made such that the dimension of the seating location on the sloping portion would be approximately .025 to .040" smaller in diameter than the aforementioned seating portion of the valve disc.

The embodiments shown in FIGURES 4, 5 and 6 relate to liners made in part from Teflon. The same general considerations hold true for the liners of FIGURES 4, 5 and 6 as has been set forth above in connection with the description of FIGURES 2 and 3; that is, the liner will still have a sloping portion with an intermediate location thereon for the seat. This sloping portion will also be resilient and the dimension at the location of the seat will be somewhat smaller than the corresponding external dimension of the seating portion of the valve disc. Since Teflon is not considered sufficiently resilient by itself, and since it is important that the tapered portion be resilient, it was necessary to provide a back-up ring of resilient material behind the tapered portion of the Teflon liner to impart sufficient resiliency to this tapered portion. Again purely by way of example, the rubber back-up ring is made from a material sold by the Du Pont Company under the name of Viton which is basically a Buna-N type rubber having a hardness of 60 to 80 durometer.

Referring to FIGURES 4, 5 and 6 in detail the valve body is generally designated by the reference numeral 40; this valve body is generally similar to the valve body 20 except for the surface configuration of its central opening 41. The valve body is provided with holes 42 and 43 adapted to accommodate shaft portions such as shaft portions 15 and 16 previously described. The Teflon lining is generally designated by the reference numeral 44. The liner 44 has a right hand flange 45 adapted to be received in a correspondingly shaped annular recess 46 in the valve body 40. The left hand side of the liner 44 is provided with a slightly larger flange 47 (for a purpose which will hereinafter appear) which is adapted to be received in a similarly shaped annular recess 48 in the valve body 44. The right hand inner portion of the liner 44 is provided with a relatively flat or cylindrical portion 49. The portion of the liner 44 to the left of the holes 42 and 43, however, is sloping as at 50 thereby providing a tapered portion similar to the tapered portion 29 previously described. Since the Teflon is not considered sufficiently resilient by itself, a rubber back-up ring 51 of "Viton" or other similar material is located behind or radially outwardly with respect to the tapered portion 50 of the liner 44. Thus the left hand side of the body 40 is further recessed as at 52 in order to accommodaate this back-up ring 51. The location of the proposed seat for the valve disc (not shown) is indicated by the reference character S. The exact position of the seating location is not critical providing that it be along the tapered portion 50; at any event, it should be understood that the diameter at the seating location will be somewhat smaller than the external seating diameter of the valve disc consistent with the explanations previously offered.

The Teflon liner will be provided with holes 53 and 54 which are in alignment with the holes 42 and 43 respectively. The outer ends of the holes in the liner will be substantially of the same diameter as the corresponding holes in the valve body; however the inner ends of these holes will be tapered as at 55, for example, in the same manner as has been described before in connection with the reduced portion 34 for the purpose of providing a seal against the shaft portions. Preferably a relief groove 56 is annularly arranged around the inner end of each of the holes in the liner to provide the proper relief for the Teflon material when the shaft portion is inserted through the hole.

Preferably the direction of flow will be as indicated by the arrow in FIGURE 4 such that the shafts and seals therefor will be on the downstream side of the valve disc when the latter is properly seated. A radially outwardly extending annular slit 57 is provided in the flange portion 47 of the liner 44 to the left of the back-up ring 51. When the valve disc (not shown) is properly seated against the tapered portion 50 the pressure in the slit 57 will tend to urge the Viton ring 51 towards the right so as to increase the seating pressure of the liner against the valve disc.

The embodiment shown in FIGURE 6 is a simplified form of that shown in FIGURE 5. Only the upper left hand portion of the liner and body structure are shown in FIGURE 6; it should be assumed that the lower left hand portion would be the same as that shown in FIGURE 6 and the entire right hand portion would be the same as that shown in FIGURE 4. Thus, the valve body 60 is provided with a hole 61 to accommodate a shaft portion of the valve disc (not shown). The Teflon liner 62 is provided with a flange 63 which fits into a correspondingly shaped annular recess 64 in the valve body 60. The liner 62 is provided with a tapered portion 50 with the provisional seat location being tentatively indicated by the reference character S. In order to provide the proper resilience for the tapered portion 50, a Viton back-up ring 65 is located behind or radially outwardly with respect to the tapered portion 50. The valve body 60 is suitably recessed at 66 to accommodate for the back-up ring 65. The Teflon liner 62 of FIGURE 6 is also provided with an opening 54, a reduced portion 55 and a relief groove 56 in the same manner and for the same purposes as described above in connection with FIGURE 5.

In the embodiment shown in FIGURE 2 an annular ring 19 is first properly machined to the correct internal and external dimensions and with recesses and holes therein; thereafter this ring 19 is properly positioned in a mold wherein the remaining rubber material can be cast around the ring. The same general considerations hold true for the embodiment shown in FIGURE 3; the ring 19' is first fashioned from hard rubber, placed in the mold and the softer or resilient rubber is then cast around the ring.

In the embodiments shown in FIGURES 5 and 6 the liner is not made by a casting or molding procedure as set forth above; rather, a cylinder of Teflon material of the proper length and thickness is machined both externally and internally to provide the general shape shown in FIGURES 4, 5, and 6. The Viton ring is attached to the Teflon by means of any suitable cement; thereafter the Teflon liner is secured to the valve body by means of a suitable cement, such as epoxy cement. In connection with the Teflon liners, if the flanges such as 45 and 63 are sufficiently thin, they need not be machined but can be created by bending the Teflon material over and into the corresponding annular grooves in the valve body and held fixed in position by means of suitable cement as described above.

In certain situations where the service requirements are such that the rigid ring 19 or 19' can be eliminated, then the ring 19' of FIGURE 3 can be made of the same material as the remainder of the liner in which case the latter can be prepared as a one-piece item in a single molding process.

The embodiments of liners as shown in FIGURES 2 and 3 are sufficiently flexible that they can be inserted into the valve body 20 by bending the flange 26 or 27 if desired. Also, if desired, the liner 18 or 18' can be cemented into position by placing a suitable cement on the surface of the opening 21 and/or the mating surface of the liner.

After the liner (of any embodiment of the present invention) has been properly aligned or installed in the valve body, the valve disc 10 is placed in position in the opening of the liner minus the valve portions 15 and 16. Thereafter the valve portions 15 and 16 are inserted through the holes 22 and 23 externally of the valve body 20 and are pushed inwardly until they are properly oriented with respect to the ears 14 and 15. The pins 17 are inserted and the valve disc 10 and shaft portions 15 and 16 become an integral body. In this regard the ears 13 and 14 can be considered as a support for the valve disc with the shaft portions forming a part of the support.

Whereas the present invention has been described in particular relation to the illustrations in the drawings, it should be understood that other and further embodiments and modifications, apart from those shown or suggested herein, may be made within the spirit and scope of this invention.

What is claimed is:

1. A liner for a butterfly valve of the type having a rigid valve body adapted to be inserted in a flow stream with an enlarged central opening in said body substantially in alignment with said flow stream and a rigid pivotal butterfly disc mounted within said valve body in said opening, said body having oppositely aligned holes extending through said body transverse to said opening, said disc being mounted on a support having shaft portions extending outwardly through said aligned holes in said body, said disc being offset and in substantially parallel relation with respect to the longitudinal center line of said shaft portions, which comprises a flexible liner covering the inner surface of said opening, said liner having flanges projecting radially outward at the opposite side edges of said liner against the side edges of said valve body radially outward of said opening, said liner having holes therein aligned with the holes in said body for receiving said shaft portions therethrough, the inner portions of the holes in said liner being of lesser diameter than said shaft portions so as to form inwardly directed shaft seals bearing against said shaft portions when said shaft portions are received through the holes of said liner, said liner having a tapered and resilient portion providing an inclined seating surface for said disc and forming a seat for said disc when said disc is in closed position transverse to said opening and said flow stream, said tapered portion sloping substantially uniformly and radially inwardly from a location between the longitudinal center line of said shafts and the seat for said disc to a location between the seat for said disc and the adjacent side edge of said liner, the seat portion of said tapered resilient portion when said disc is not in contact therewith being of lesser diameter than the seating portion of said disc, whereby, when said disc is in its closed position, the seating portion of said disc will compress said tapered portion radially outwardly.

2. A liner for butterfly valve as set forth in claim 1 wherein said liner is made substantially entirely of resilient rubber material.

3. A liner for butterfly valve as set forth in claim 1 wherein the portion of said liner in contact with the surface of the opening in said valve body constitutes a substantially rigid ring and the remainder of said liner is made substantially entirely of resilient rubber material, said rigid ring having aligned openings therein aligned with the holes in said body for receiving said shaft portions therethrough.

4. A liner for butterfly valve as set forth in claim 3 wherein the holes in said rigid ring are provided with O-ring seals comprising secondary seals for said shaft portions.

5. A liner for a butterfly valve of the type having a rigid valve body adapted to be inserted in a flow stream with an enlarged central opening in said body substantially in alignment with the said flow stream and a rigid pivotal butterfly disc mounted within said valve body in said opening, said body having oppositely aligned holes extending through said body transverse to said opening, said disc being mounted on a support having shaft portions extending outwardly through said aligned holes in said body, said disc being offset and in substantially parallel relation with respect to the longitudinal center line of said shaft portions, which comprises a flexible Teflon liner covering the inner surface of said opening, said liner having flanges projecting radially outward at the opposite side edges of said liner against the side edges of said valve body radially outward of said opening, said liner having holes therein aligned with the holes in said body for receiving said shaft portions therethrough, the inner portions of the holes in said liner being of lesser diameter than said shaft portions so as to form inwardly directed shaft seals bearing against said shaft portions when said shaft portions are received through the holes of said liner, said liner having a tapered portion providing an inclined seating surface for said disc and forming a seat for said disc when said disc is in closed position transverse to said opening and said flow stream, said tapered portion sloping substantially uniformly and inwardly from a location between the longitudinal center line of said shafts and the seat for said disc to a location between the seat for said disc and the adjacent side edge of said liner, a resilient rubber ring located between said liner and said valve body in the region of said tapered portion to provide resiliency for said tapered portion, the seat portion of said tapered portion when said disc is not in contact therewith being of lesser diameter than the seating portion of said disc, whereby, when said disc is in its closed position, the seating portion of said disc will compress said tapered portion radially outwardly.

6. A liner for butterfly valve as set forth in claim 5 wherein said liner is provided with a slit extending radially outwardly at a location between said adjacent side edge of said liner and said resilient rubber ring.

7. A liner for butterfly valve as set forth in claim 5 wherein said liner is provided with an annular relief groove concentric with and surrounding each of the holes of said liner adjacent the inner portions thereof.

References Cited

UNITED STATES PATENTS

| 3,215,400 | 11/1965 | Muller | 251—306 |
| 3,241,806 | 3/1966 | Snell | 251—306 X |
| 3,306,573 | 2/1967 | Trefil | 251—306 |
| 3,329,398 | 7/1967 | Goldsmith | 251—306 |

HENRY T. KLINKSIEK, Primary Examiner

U.S. Cl. X.R.

251—148